(12) United States Patent
Berens et al.

(10) Patent No.: US 6,790,079 B2
(45) Date of Patent: Sep. 14, 2004

(54) METHOD, APPARATUS, AND SYSTEM OF CARD AND CONNECTOR RETENTION

(75) Inventors: Jessica Rose Berens, Rochester, MN (US); Dano Ben Lange, Rochester, MN (US); Scott Raymond LaPree, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 10/301,161

(22) Filed: Nov. 21, 2002

(65) Prior Publication Data

US 2004/0102087 A1 May 27, 2004

(51) Int. Cl.[7] .................... H01R 13/60; H01R 35/00
(52) U.S. Cl. ............... 439/534; 439/76.1; 439/638
(58) Field of Search ................. 439/534, 76.1, 439/638, 955, 247–248; 361/807, 809–810

(56) References Cited

U.S. PATENT DOCUMENTS

| | | | | |
|---|---|---|---|---|
| 4,573,753 A | * | 3/1986 | Vogl | 439/65 |
| 5,460,547 A | * | 10/1995 | Belt et al. | 439/638 |
| 5,754,404 A | * | 5/1998 | Biermann et al. | 361/737 |
| 6,266,248 B1 | * | 7/2001 | Hanas et al. | 361/752 |
| 6,358,079 B1 | * | 3/2002 | Noble | 439/328 |
| 6,442,037 B1 | * | 8/2002 | Boe | 361/759 |
| 6,575,771 B2 | * | 6/2003 | Schnatwinkel et al. | 439/76.1 |
| 6,648,695 B1 | * | 11/2003 | Wu | 439/638 |

* cited by examiner

*Primary Examiner*—Michael C. Zarroli
(74) *Attorney, Agent, or Firm*—Leslie J. Payne

(57) ABSTRACT

A connector retention apparatus for resiliently retaining connectors of different heights in mated engagement with a device. Included in the apparatus is a base assembly adapted to be connected to a device; and, at least a resiliently deflectable assembly connected to the base assembly and including a connector engaging portion that is biased for engagement with a connector and capable of accommodating and biasing connectors of varying heights into mated engagement with a device. A card and connector retention system for retaining a printed circuit card assembly to a device and a connector to the printed circuit card assembly. The system includes a connector assembly for retaining a printed circuit card assembly to a device; and, a connector retention apparatus for resiliently retaining connectors of different heights in mated engagement with the printed circuit card assembly. The connector retention apparatus is couplable to the connector assembly. A method of assembly is also provided.

19 Claims, 5 Drawing Sheets

METHOD, APPARATUS, AND SYSTEM OF CARD AND CONNECTOR RETENTION

BACKGROUND OF THE INVENTION

The present invention relates generally to system, apparatus, and method of card and connector retention and, more particularly, to retention of a printed circuit card assembly or the like to an electronic connector assembly for retaining the printed circuit card assembly to an electronic device as well as for positive retention of connectors to such device.

DVD players are being integrated into computer systems as stand-alone units or as an integral part of the computer chassis. For instance, a vast majority of DVD players have an IDE interface and it is desirable to integrate these DVD players into systems having SCSI interfaces. For effecting such integration and conversion, an adapter or interposer card electrically couples the DVD player to a motherboard of the computer system. Essentially, the interposer card is a relatively small printed circuit board having a connector portion that externally snaps into the DVD player and allows a flex circuit connector from the motherboard to connect to the DVD player through the interposer card. However, should the interposer card be added in a manner whereby the card is not securely retained several disadvantages arise including shorting out of the card and device. This is especially a concern given vibration issues and the relatively compact physical constraints of existing DVD mounting systems. Moreover, the type of connectors used in conjunction with these DVD's can vary depending on the kind of DVD and computer system. It is also highly desirable to be able to retain connectors of varying height dimensions to the various DVD's and computer systems.

Without the ability to successfully join a printed circuit card assembly to an electronic device in a manner that satisfies reliability concerns and within the space constraints of known computer systems the potential of economically modifying existing electronic devices with printed circuit cards for use in known systems is diminished. Furthermore, without the ability to successfully positively retain connectors of varying heights to an electronic device or the like, the true potential of providing for a simplified, versatile and reliable cable connector system is also diminished.

SUMMARY OF THE INVENTION

It is an aspect of the present invention to provide for an improved system, apparatus, and method of securing a printed circuit card assembly or the like to a device, preferably, in a computer system as well as for securely mounting and retaining electrical cable connectors and the like to the printed circuit card assembly.

In this regard, provision is made for a connector retention apparatus for resiliently and positively retaining connectors of different heights in mated engagement with a device, the apparatus comprising: a base assembly adapted to be connected to a device; and, at least a resiliently deflectable assembly connected to the base assembly and including a connector engaging portion that is biased for engagement with a connector and is capable of accommodating and biasing connectors of varying heights into mated engagement with a device.

In an illustrated embodiment, the deflectable assembly includes a resilient bridging assembly including having the connector engaging portion generally located at an apex of the bridging assembly.

In still another illustrated preferred embodiment, provision is made for a connector assembly for retaining a printed circuit card assembly to a device. The connector assembly comprises: a connector member adapted to be connected to a device; and a fastening assembly for securing the connector member to the device. The connector member includes a first set of latching members for latching a printed circuit card assembly thereto, whereby the printed circuit card assembly can be electrically coupled to the device.

In yet another illustrated embodiment of the present invention, provision is made for a card and connector retention system. Included in the card and connector retention system for retaining a printed circuit card assembly and a connector to a device is a connector assembly for retaining a printed circuit card assembly to a device; and, a connector retention apparatus for resiliently retaining connectors of different heights in mated engagement with the printed circuit card assembly. In still another embodiment, the connector retention apparatus is coupled to the connector assembly for securing a connector to the printed circuit card assembly.

In still another illustrated embodiment of the present invention, provision is made for a computer system comprising: a computer enclosure; an electronic device in the enclosure; and, a card and connector retention system for retaining a printed circuit card assembly to the device and a connector to the printed circuit card assembly. The system comprises: a connector assembly for retaining a printed circuit card assembly in electrically coupled relationship to the device; and, a connector retention apparatus for resiliently engaging a connector and for accommodating connectors of different heights in mated engagement with the printed circuit card assembly. In yet another embodiment, the connector retention apparatus is coupled to the connector assembly.

In yet a further embodiment of the present invention, provision is made for a method of securing a printed circuit card assembly and a connector to an electronic device in a computer system. The method includes the steps of: providing a connector assembly having a connector member adapted to be connected to the device so as to electrically couple the printed circuit card assembly to the device; and a fastening assembly for securing the connector member to the device. The provided connector member includes a first set of latching members for latching a printed circuit card assembly thereto. The method also includes providing a connector retention apparatus for resiliently retaining connectors of different heights in mated engagement with the printed circuit card assembly. The connector retention apparatus comprises a base assembly adapted to be connected to the device; and, at least a resiliently deflectable assembly interconnected to the base assembly and including a connector engaging portion that is biased for engagement with a connector and for accommodating and biasing connectors of varying heights into mated engagement with the printed circuit card assembly. The method also includes mating a connector of a cable to the printed circuit card assembly so that the connector engaging portion is biased into engagement with the connector for insuring a positive mating engagement. The method also includes coupling the connector retention apparatus to the connector assembly.

In yet another embodiment of the present invention, provision is made for a method of securing connectors of varying heights to an electronic device; the method comprising the steps of: providing a connector retention apparatus for resiliently retaining connectors of different heights in mated engagement with the device, wherein the assembly comprises: a base assembly adapted to be connected to the device; and, at least a resiliently deflectable assembly connected to the base assembly and including a connector engaging portion that is biased for engagement with a connector and for accommodating and biasing connectors of varying heights into mated engagement with the device. The method includes mating a connector of a cable to the device so that the connector is in positive mated engagement with the device.

An aspect of the present invention is to provide for an improved connector assembly for use in positively retaining a printed circuit card assembly in electrically coupled relationship to an electronic device, such as an I/O device.

Another aspect of the present invention is to provide for an improved card connector assembly for use in positively retaining a printed circuit card assembly to an electronic device within the space constraints of an existing computer system.

Another aspect of the present invention is to provide for an improved card connector assembly for use in positively retaining a printed circuit card assembly to an electronic device so as to electrically couple the card assembly to the device as well as minimize vibration instability issues of the card assembly while mounted.

Another aspect of the present invention is to provide for an improved connector retention apparatus for reliably securing cable connectors of varying heights to an electronic device.

Another aspect of the present invention is to provide for an improved system including a connector retention apparatus coupled to a card connector assembly for reliably securing cable connectors of varying heights to a printed circuit card carried on the connector assembly, whereby the connector assembly is secured to an electronic device so that the printed circuit card assembly is electrically coupled to the electronic device.

Another aspect of the present invention is to provide for a method of positively retaining a printed circuit card assembly and a cable connector to an electronic device, such as an I/O device in a computer system.

DETAILED DESCRIPTION

Figure 1:
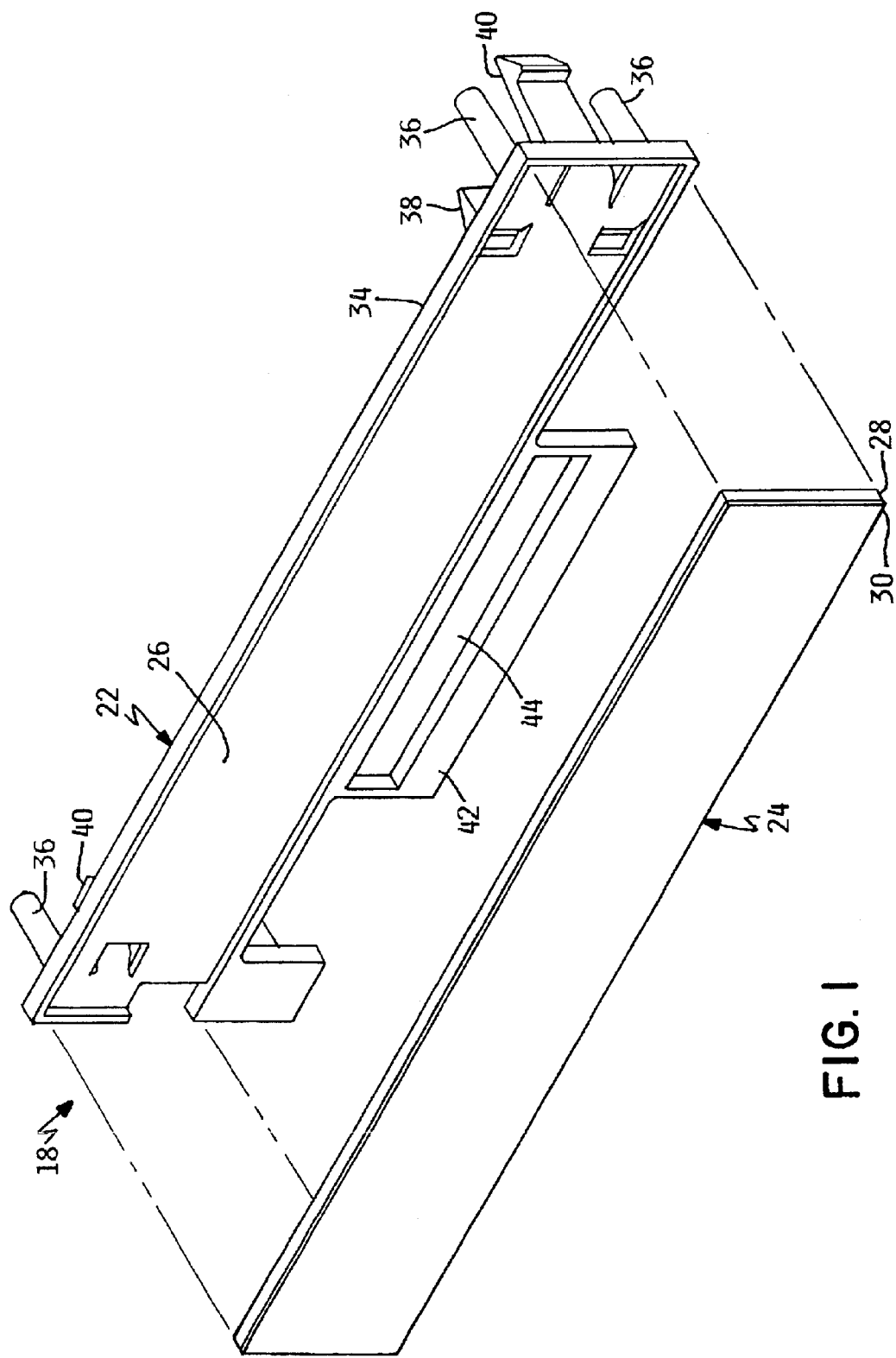
FIG. 1 is an exploded perspective view of a card connector assembly made according to the present invention.

Reference is made to FIGS. 1–5 for illustrating one preferred embodiment of an improved card and connector retention system 10 for use in retaining a printed circuit card assembly 12 and a cable connector 14 to a DVD device 16.

Included in the card and connector retention system 10 is a card connector assembly 18 that is adapted to retain the printed circuit card assembly 12 to the DVD device 16; and, a connector retention assembly or apparatus 20 (FIG. 4) that is adapted for securing cable connectors of varying heights to the connector assembly on the DVD device. While this embodiment describes a DVD device, the spirit and scope of this invention embraces other I/O devices or other electronic devices or systems that can be modified by externally connecting a printed circuit card assembly thereto and which may be integrated into a computer system or the like. Further, any kind of printed circuit card assembly or board that is adapted to be connected to an electronic device can be utilized for use with the connector assembly of this invention. It will be further understood that the present invention is not limited to use with the specific embodiments illustrated and described herein, but rather envisions a variety of differently constructed devices for achieving the functions of the present invention as set forth below and as yet developed.

In this embodiment, the card connector assembly 18 includes a connector member 22 and an adhesive coupling assembly 24 which functions as a fastener. As illustrated, the connector member 22 has a generally elongated and flat configuration, preferably, made of a low-cost, electrically non-conducting plastic material, such as ABS or other similar material. The adhesive coupling assembly 24 is secured to one generally planar surface 26 of the connector member 22. In this embodiment, the adhesive coupling assembly 24 can include any suitable and commercially available pressure sensitive adhesive unit that includes an adhesive pad 28 bonded with sufficient strength to an axial extent of the planar surface 26; and, a peelable release sheet 30 that is to be externally peeled off by a user when it is desired to have the external pad's surface uncovered by the release sheet and superimposed over and secured to an end surface 32 (FIG. 3) of the DVD device 16. The foregoing fastening approach facilitates a low-cost and reliable toolless connection. While the foregoing is clearly preferred, other forms of fastening can be used.

Figure 2:
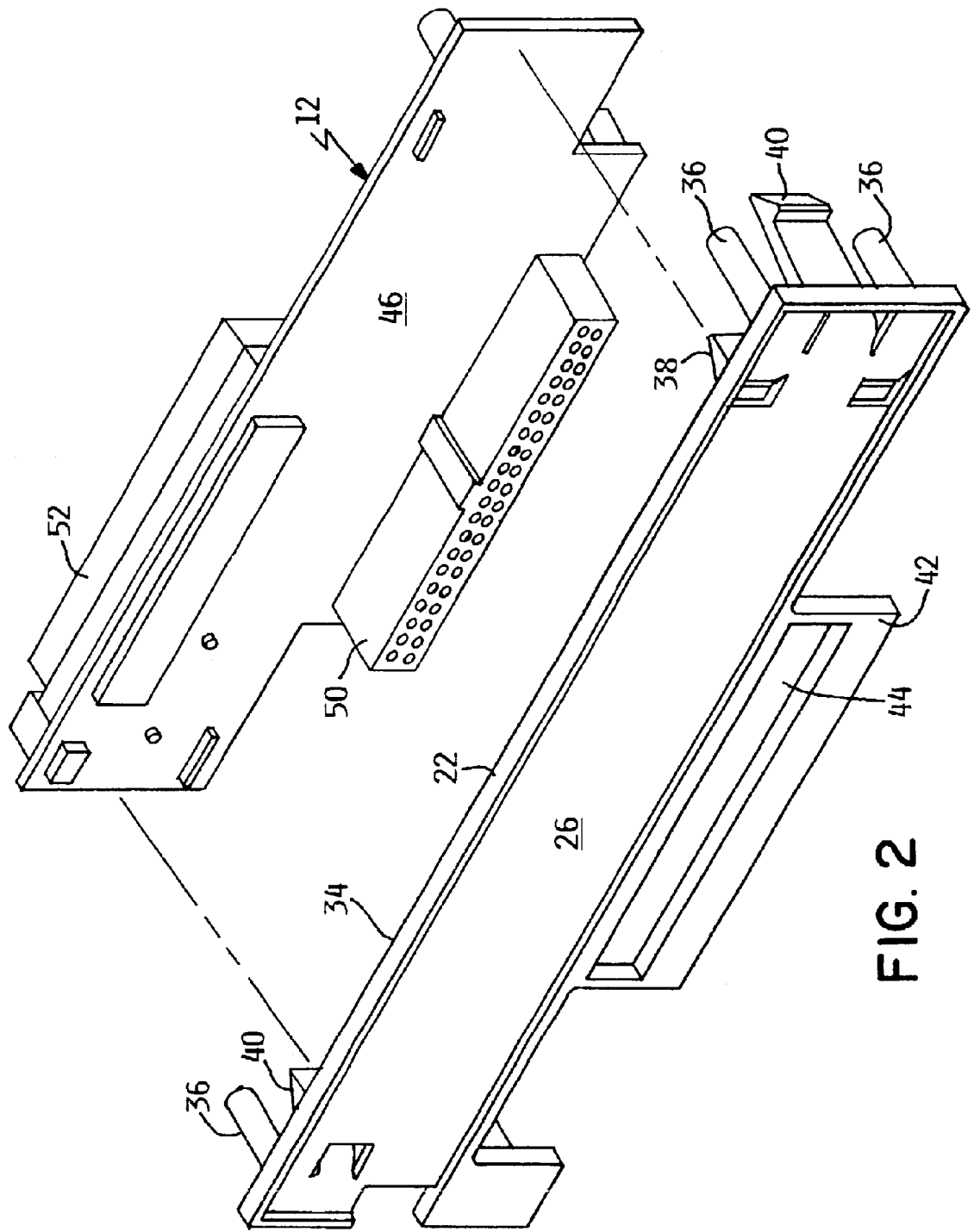
FIG. 2 is an exploded perspective view of a card connector assembly made according to the present invention relative to a printed circuit card that is to be secured to a DVD device.
Figure 3:
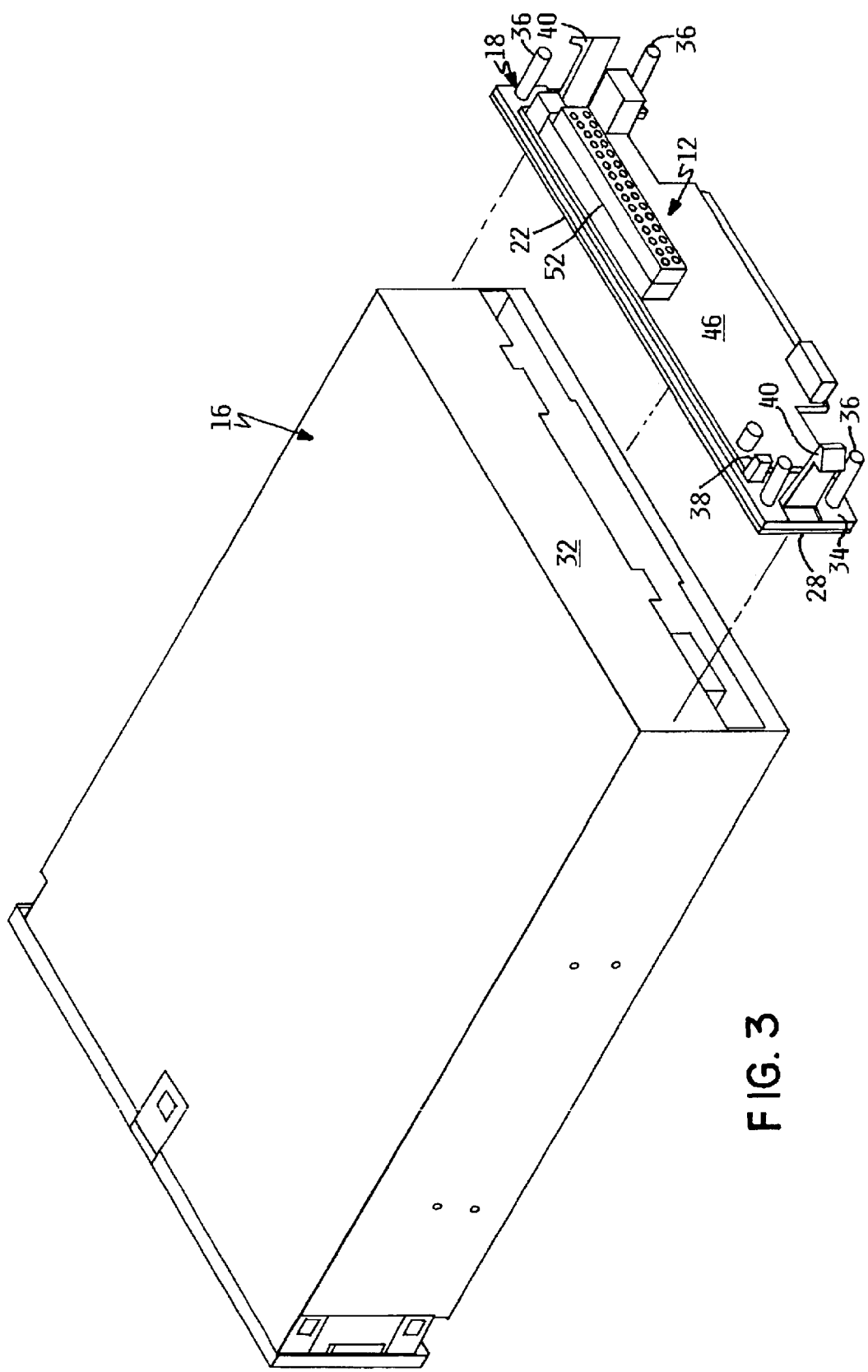
FIG. 3 is an exploded perspective view of a card connector assembly printed circuit card relative to a DVD device.
Figure 4:
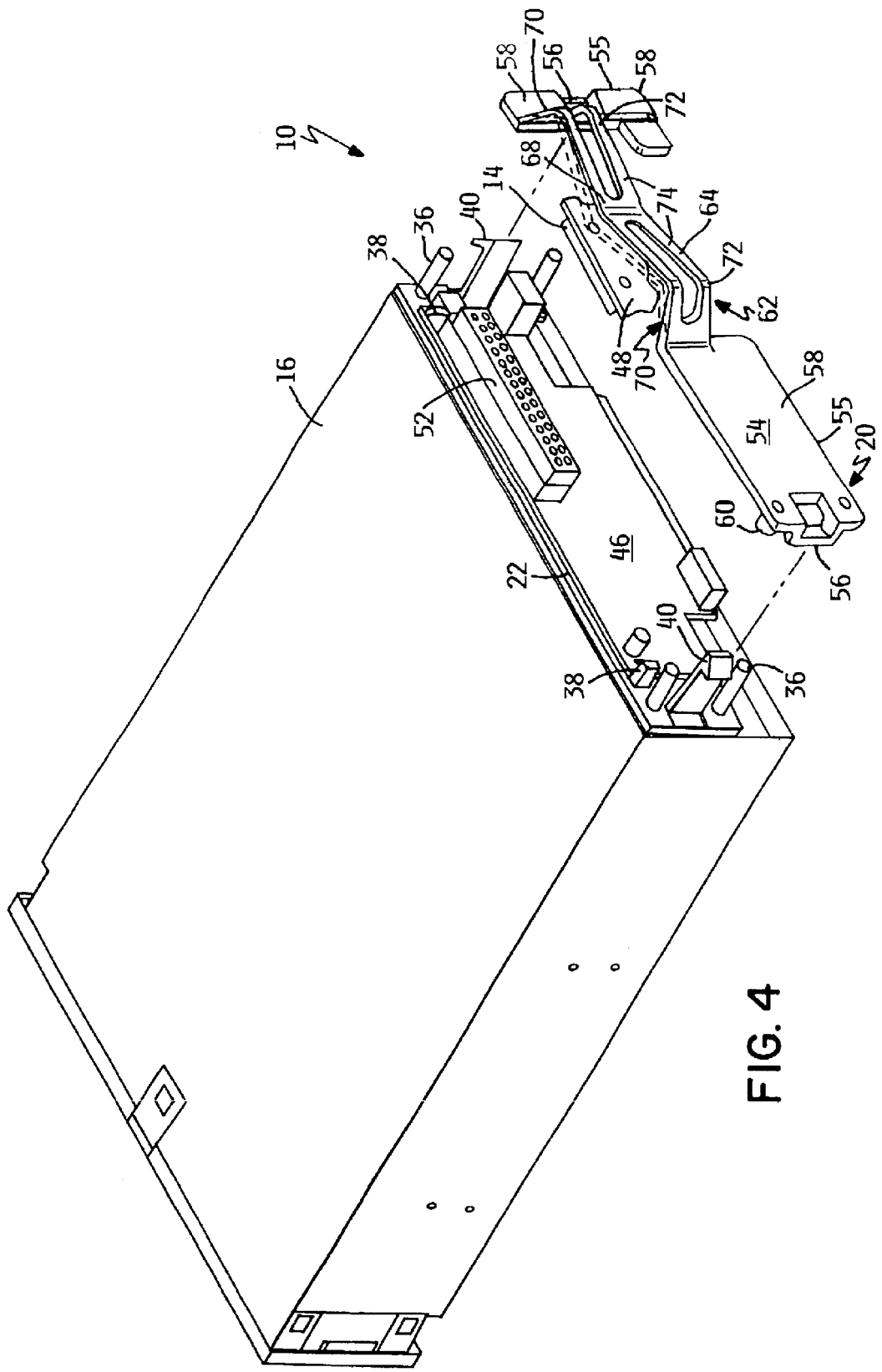
FIG. 4 is an exploded perspective view of a connector retention assembly relative to a printed circuit card that is mounted to the DVD device by the card connector assembly.
Figure 5:
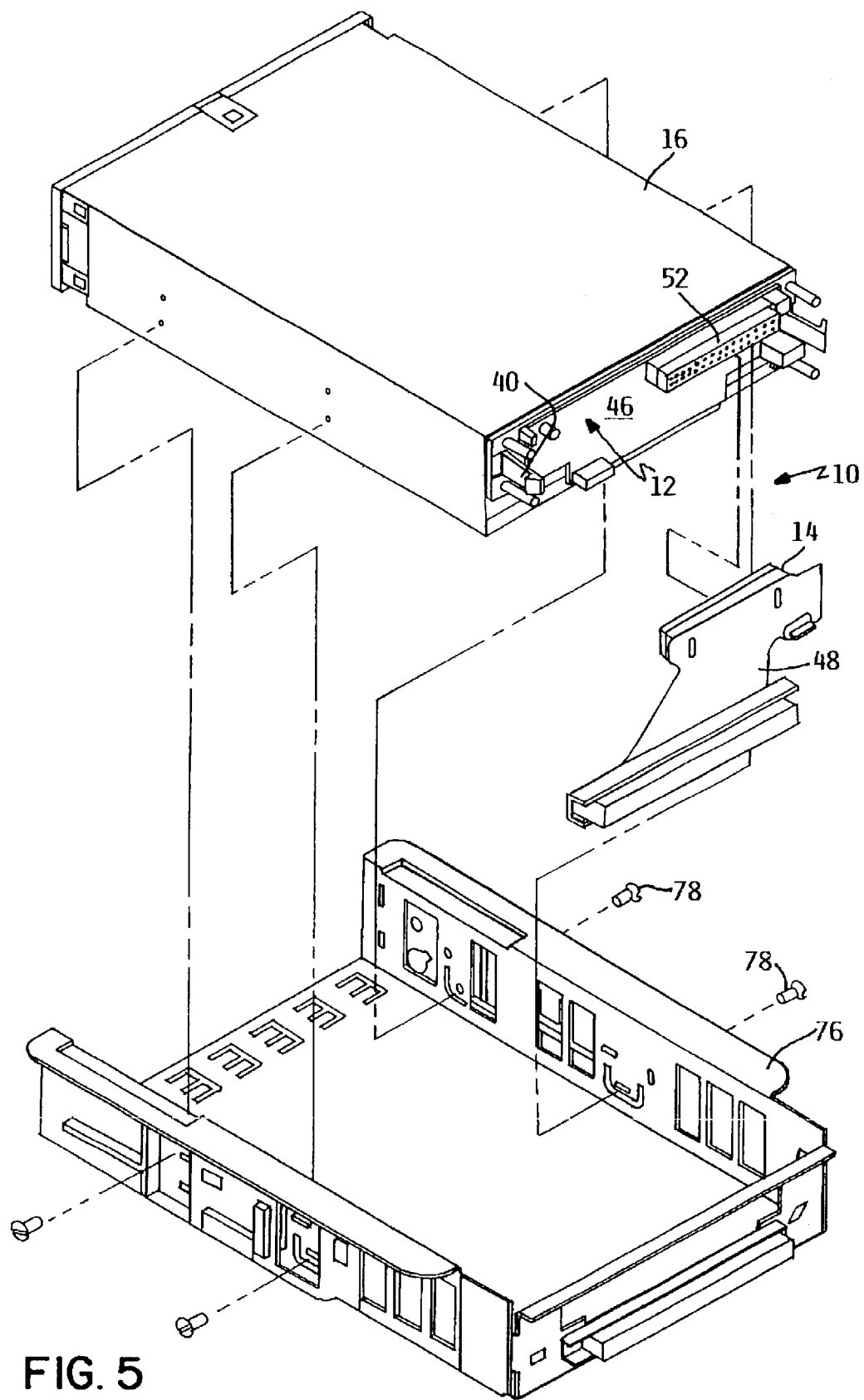
FIG. 5 is an exploded perspective view of a DVD device as modified by the invention and an associated chassis assembly for retaining the former.

Extending from an opposing generally planar surface 34 of the connector member, as seen in FIGS. 2–4, is a pair of posts 36 adjacent each longitudinal end thereof, an upstanding latching arm 38 at each such end for latching to end portions of the printed circuit card assembly, and latching fingers 40 for latching the connector retention apparatus. The latching arms 38 provide a first set of latching members and the latching fingers 40 provide a second set of latching members. An apertured connector retainer plate 42 extends outwardly and has a connector aperture or opening 44 that is positioned for assisting in retaining a connector member thereby and for alignment thereof. The opening 44 assists in auto-positioning the card to the device. Reference is made back to the printed circuit card assembly 12 which in this embodiment comprises a generally planar interposer card 46 that is to be electrically coupled to the DVD and as well as a motherboard as by a cable connector 48, such as a flex cable 48. The interposer card 46 of this embodiment has internal and external connectors 50, 52; respectively, or as viewed in the drawings inwardly and outwardly directed. While the interposer card 46 of this embodiment is useful for converting SCSI to IDE, or vice versa, other forms of cards can be used for effecting other conversions. Advantageously, the foregoing construction of generally parallel components assists greatly in providing a compact and relatively thin arrangement for facilitating mounting in space constrained areas.

Reference is now made to the connector retention apparatus or connector strain-relief assembly 20, which in this embodiment is defined as a molded connector retention or strain-relief member 54 for releasable cooperation with the connector member 22. The connector retention member 54 is advantageously constructed for releasable cooperation with the connector member 22 in a manner to be described for purposes of positively retaining connectors of varying heights in mated engagement into the external connector 52 on the interposer card 46. It will be appreciated that the connector retention apparatus positively retains the cable connectors. The connector retention member 54 includes a base assembly 55 and a bridging assembly 62. In this particular embodiment, the connector retention member 54 has a generally elongate and unitary molded body made of a low-cost and non-electrically conductive plastic. Other suitable materials or combinations of materials are envisioned. While a unitary construction is shown, it will be appreciated that such is not required but rather a variety of other constructions and configurations are envisioned. Each of the latching fingers 40 latchingly cooperate with raised latching members or bars 56 located at opposite ends of the retention member 54. The base assembly 55 of the retention member includes a plurality of pads 58. One of the pads 58 is formed adjacent to one end thereof and stubs 60 extending therefrom are placed outwardly relative to the latching fingers 40 and cooperate with the posts 36 so as to place the apparatus 20 under tension for effecting the releasable latching engagement to be described.

For securing connectors of varying heights, the present invention makes provision for the resiliently deflectable connector bridging assembly 62. The connector bridging assembly 62 is particularly adapted for biasingly engaging back ends of cable connectors having different heights; such as a cable connector 14 attached to one end of the connector cable 48. The cable connector 14 is adapted to engage the external connector 52 of the interposer card 46 while the other connector is adapted to engage the motherboard (not shown) of the computer system. In addition, while this embodiment discloses that the bridging assembly is, preferably, comprised of a single bridging element 64 clearly the invention envisions that such need not be the case and that several elements can be provided.

The bridging element 64 has a generally protruding shape which in the preferred embodiment is a generally v-shaped configuration with at least a generally intermediate connector engaging portion 68 formed at its apex. Whatever shape is selected, however, it should be deflectable for positively retaining connectors of different heights. The bridging element 64 has opposite upstanding distal end portions 70 connected to the pads. The bridging element 64 has bent portions at 72 and has arm members 74 continuing from the bend to the connector engaging portion 68. This arrangement provides a resiliently biased bridging element 64 for maintaining a connector into firm engagement with the external connector of the interposer card. It will be appreciated that this construction allows the bridging element to deflect (see phantom lines in FIG. 4) the necessary amount for accommodating connectors of varying heights while providing for their positive retention. This provision advantageously assists in positively retaining a wide variety of connectors. Also, this construction is relatively inexpensive since it is but a single member. It will be appreciated that such a construction facilitates a more positive retention of the plug-in connector.

While this embodiment is being used in combination with the connector member 22, it will be further appreciated that the principles of this invention do not limit the connector retention apparatus 20 being used in combination therewith. Rather, the latter can be used in a wide variety of circumstances. It will be additionally understood that this invention can be used not only in combination with a DVD device, but other devices for positively retaining the connector therein. Because of the relatively compact construction of the card and connector retention system 10 it can be easily mounted to a known DVD tray 76 using fasteners 78, whereby no changes have to be done to a conventional tray in order to mount the DVD player. Accordingly, the reliable and positive retention of a printed circuit card assembly and a connector of a cable can be easily accomplished by having the card connector assembly 18 secured to the end surface 32 of the DVD player. The interposer card 46 can be latched to the opposing surface of the connector member 22. Thereafter, a connector is secured to the external connector 52 and the card connector retention apparatus or assembly 20 is latched to the connector member as indicated above. It will be appreciated that the bridging element 64 biases the connector into firm engagement with the DVD device for a secure connection. The deflectibility of the bridging assembly allows it to cooperate with known connectors of different heights, thereby making the present invention highly versatile for a wide variety of connectors.

The embodiments and examples set forth herein were presented to best explain the present invention and its practical applications and to thereby enable those skilled in the art to make and use the invention. However, those skilled in the art will recognize that the foregoing description and examples have been presented for the purposes of illustration and example only. The description set forth is not intended to be exhaustive or to limit the invention to the precise forms disclosed. Many modifications and variations are possible in light of the above teachings without departing from the spirit and scope of the appended claims.

What is claimed is:

1. A connector retention apparatus for resiliently retaining connectors of different heights one at a time in mated engagement with a device, the apparatus comprising: a base assembly adapted to be connected to a device; and, at least a resiliently deflectable assembly connected to the base assembly and including at least a connector engaging portion that is biased for engagement with a connector and is capable of accommodating and biasing various connectors of different heights into mated engagement with a device; wherein the deflectable assembly includes a resilient bridging assembly, wherein the connector engaging portion is generally located at an apex of the bridging assembly.

2. The apparatus of claim 1 wherein the bridging assembly is a unitary molded member being resiliently deformable.

3. The apparatus of claim 1 wherein the bridging assembly includes a generally v-shape.

4. The apparatus of claim 1 wherein the base assembly includes opposite end portions thereof onto which latching members may engage for releaseably latching the apparatus to a connector assembly.

5. A connector assembly for retaining a printed circuit card assembly to a device; the connector assembly comprising: a connector member adapted to be connected to a device; and a fastening assembly for securing the connector member to a device; the connector member includes a first set of latching members for latching a printed circuit card assembly thereto so that a printed circuit card assembly can be electrically coupled to a device; wherein the fastening assembly includes an adhesive assembly attached to one surface of the connector member; the adhesive assembly including a peelable portion which when peeled exposes an area of adhesive capable of allowing the connector assembly to be adhesively fastened to a surface of a device.

6. The connector assembly of claim 5 wherein the first set of latching members protrude from a second surface that is opposing the one surface for allowing a connector retention apparatus to be secured.

7. The connector assembly of claim 5 further including a second set of latching members for latchingly cooperating with a connector retention apparatus that is adapted to retain a cable connector in mated engagement with a device.

8. The connector assembly of claim 5 further including an alignment opening for receiving therein a connector of a printed circuit card assembly so as to assist in alignment of a printed circuit card assembly to a connector of a device.

9. A card and connector retention system for retaining a printed circuit card assembly to a device and a connector to a printed circuit card assembly; the system comprising: a connector retention apparatus for resiliently retaining connectors of different heights one at a time in mated engagement with a device; and, a connector assembly for retaining a printed circuit card assembly to a device so that a printed circuit card assembly can be electrically coupled thereto; the connector retention apparatus is releasably coupled to the connector assembly so as to retain a connector to a printed circuit card assembly; and, wherein the connector retention apparatus includes a base assembly adapted to be connected to a device; and, at least a resiliently deflectable assembly connected to the base assembly and including a connector engaging portion that is biased for engagement with a connector and is capable of accommodating and biasing various connectors of different heights into mated engagement with a device.

10. The card and connector retention system of claim 9, wherein the deflectable assembly includes a resilient bridging assembly, wherein the connector engaging portion is generally located at an apex of the bridging assembly.

11. The card and connector retention system of claim 9 wherein the connector assembly includes a connector member adapted to be connected to a device; and a fastening assembly for securing the connector member to a device; the connector member includes a first set of latching members for latching a printed circuit card assembly thereto so that a printed circuit card assembly can be electrically coupled thereto.

12. The card and connector retention system of claim 10 wherein the fastening assembly includes an adhesive assembly attached to one surface of the connector member; the adhesive assembly including a peelable portion which when peeled exposes an area of adhesive capable of allowing the connector assembly to be adhesively fastened to a surface of a device.

13. The card and connector retention system of claim 11 wherein the connector assembly includes an alignment opening for receiving therein a connector portion of a printed circuit card assembly which assists in alignment of the connector portion to a printed circuit card assembly and alignment of the connector assembly to a device.

14. A computer system comprising:
a computer enclosure;
an electronic device in the enclosure;
a card and connector retention system for retaining a printed circuit card assembly and a connector to the device; the system comprising: a connector assembly for retaining a printed circuit card assembly to the device so as to electrically couple a printed circuit card assembly to the device; and,
a connector retention apparatus for resiliently retaining a connector in mated engagement with a printed circuit card assembly; wherein the connector retention apparatus includes a base assembly adapted to be connected to the device; and, at least a resiliently deflectable assembly connected to the base assembly and including a connector engaging portion that is biased for engagement with a connector and is capable of accommodating and biasing various connectors of different heights into mated engagement with the device.

15. The computer system of claim 14 wherein the connector assembly includes a connector member adapted to be connected to the device; and a fastening assembly for securing the connector member to the device; the connector member includes a first set of latching members for latching a printed circuit card assembly thereto.

16. The computer system of claim 15 wherein the fastening assembly includes an adhesive assembly attached to one surface of the connector member; the adhesive assembly including a peelable portion which when peeled exposes an area of adhesive capable of allowing the connector assembly to be adhesively fastened to a surface of the device.

17. The computer system of claim 14 wherein the connector retention apparatus is coupled to the connector assembly so that a connector is coupled to a printed circuit card assembly on the connector member.

18. A method of securing a printed circuit card assembly to an electronic device in a computer system and a connector to the printed circuit card assembly; the method comprising the steps of:

providing a connector assembly having a connector member adapted to be connected to the device; and a fastening assembly for securing the connector member to the device; the connector member includes a first set of latching members for latching a printed circuit card assembly thereto;

mounting a printed circuit card assembly to the connector member by the first set of latching members;

providing a connector retention apparatus for resiliently retaining connectors of different heights one at a time in mated engagement with the printed circuit card assembly, the assembly comprising: a base assembly adapted to be connected to the connector assembly; and, at least a resiliently deflectable assembly connected to the base assembly and including a connector engaging portion, wherein the deflectable assembly includes a resilient bridging assembly, wherein the connector engaging portion is generally located intermediate the bridging assembly that is biased for engagement with a connector for accommodating and biasing various connectors of different varying heights into mated engagement with the printed circuit card assembly; and, mating a connector of a cable to the printed circuit card assembly so that the connector engaging portion is biased into engagement with the connector for insuring a positive mating engagement.

19. A method of securing connectors of varying heights to an electronic device; the method comprising the steps of:

providing a connector retention apparatus for resiliently retaining connectors of different heights one at a time in mated engagement with an electronic device, an assembly comprising: a base assembly adapted to be connected to an electronic device; and, at least a resiliently deflectable assembly connected to the base assembly and including a connector engaging portion, wherein the deflectable assembly includes a resilient bridging assembly, wherein the connector engaging portion is generally located intermediate the bridging assembly that is biased for engagement with a connector and is capable of accommodating and biasing various connectors of different heights into mated engagement with an electronic device; and, mating a connector of a cable to the device so that the connector is in firm mated engagement with an electronic device.

* * * * *